April 2, 1946.  A. R. MITCHELL  2,397,801
SNAP FASTENER
Filed Oct. 27, 1942
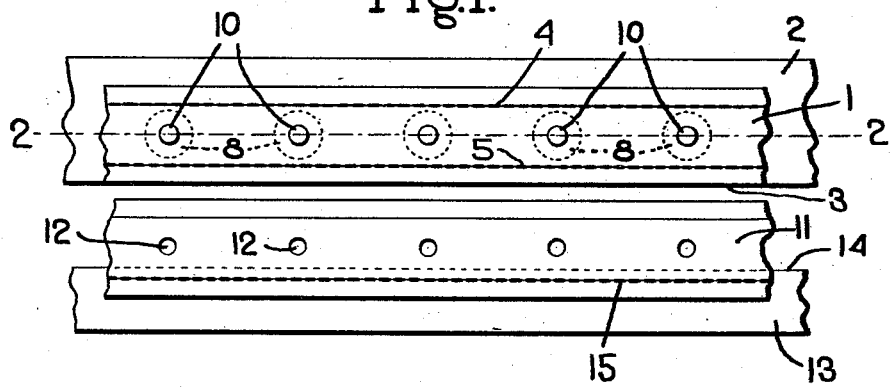
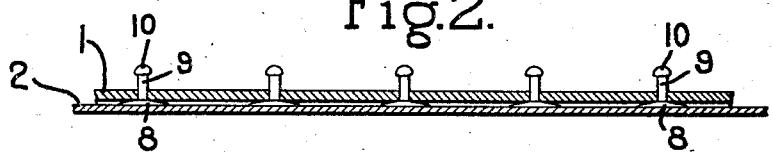
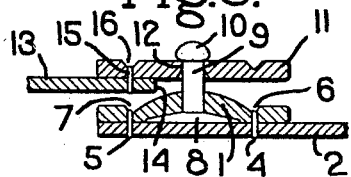
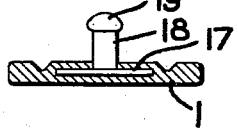
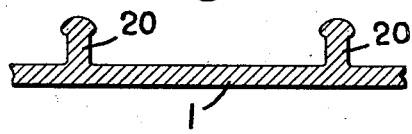
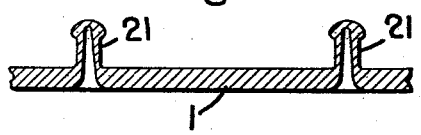
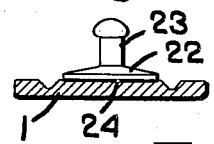
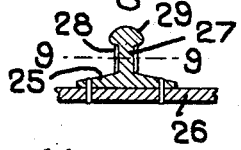
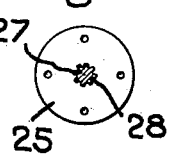
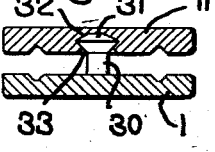
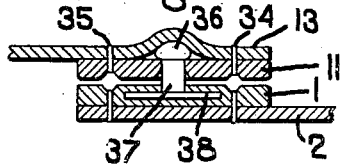
Inventor.
Alexander R. Mitchell
by Heard Smith & Tennant.
Attys.

Patented Apr. 2, 1946

2,397,801

UNITED STATES PATENT OFFICE 2,397,801

SNAP FASTENER

Alexander R. Mitchell, Dedham, Mass.

Application October 27, 1942, Serial No. 463,457

8 Claims. (Cl. 24—204)

This invention relates to improvements in snap fasteners of the type which comprise complementary male and female members adapted to be secured to overlapping portions of a garment, upholstery, and other articles, one of which members is provided with a stud releasably to engage a socket in the complementary member, and the general object of the present invention is to provide a snap fastener in which one or both members is of elastic synthetic plastic material.

In usual snap fastener constructions the complementary members are formed of stamped metal having means adapted to be affixed to the parts which are to be united by the fasteners and the stud, or the socket member, is slitted, recessed, or deformed to provide a resilient wall or walls adapted when the stud is inserted in the socket releasably to hold it therein.

The mechanisms required to form the complementary parts of such metal fasteners are necessarily of complicated and expensive construction. Furthermore, in view of the shortage of metal due to war conditions it is now difficult to obtain proper stock for the manufacture of metallic fasteners. Complementary metal snap fastener parts are manufactured in individual units and usually mounted upon the cards in such manner that the parts may be separated and stitched and otherwise secured to the portions of the articles which are to be joined. In some instances, however, these individual snap fastener parts are secured to tapes at suitable intervals so that the tapes can be sewed to the portions of the articles to be joined.

The principal object of the present invention is to provide a snap fastener construction in which the socket member is of elastic plastic material provided with a socket or sockets which may extend through or partially through the material and which by its inherent elasticity will contract upon the shank of the stud sufficiently to prevent the head of the stud from being withdrawn from the socket unless considerable force is applied to the parts to cause a separation thereof.

The terms "plastic material" or "synthetic plastic material" are used herein as defining a synthetic material the chief component of which is a resin or other organic binder in which single molecules are linked together by polymerization or condensation to form larger molecules without change in chemical composition and to exclude rubber and inorganic materials such as ceramics, cements, and the like.

Another object of the invention is to provide a construction in which a strip of elastic waterproof non-corrodible plastic material is provided with suitably spaced sockets and a complementary snap fastener member provided comprising a similar strip of elastic plastic material provided with suitable studs attached thereto at similarly spaced intervals, the elastic plastic material being of such character as to be capable of being secured to a suitable tape or directly to the goods to which the strip is applied by a line or lines of stitching which may be of thread, a series of staples, or other suitable penetrating and interlocking means.

Another object of the invention is to provide a strip of elastic plastic material provided with a series of spaced sockets adapted to be secured to suitable flexible material, such as dress material, furniture coverings, and the like, adapted to receive studs of integral material which can be cheaply made, and which may be secured at like intervals to any suitable base, such as a portion of a garment underlying the portion to which the socket strip is attached, or to a suitable tape adapted to be secured to the portion of the article to be joined to that to which the elastic plastic strip having sockets is applied, or to the frame of furniture, or the like, for the purpose of enabling a slip cover to be detachably secured thereto.

A further object of the invention is to provide a snap fastener construction comprising a strip of elastic plastic material containing contractible sockets formed therein by punching or moulding which can be readily constructed without the use of complicated machines, such as are required to produce resilient metallic socket members, and which will receive and properly retain studs of integral construction formed of metal, glass, plastic material or any other material which affords sufficient rigidity to enable a slightly enlarged head of the stud to be releasably inserted in the socket of the plastic strip and which will be of sufficient strength properly to hold the parts to which the snap members are attached in releasable engagement.

The development of the plastic art is such that suitable elastic plastic material can be readily obtained, such, for example, as those produced from a cellulose base, polystyrene, or from various resins including acrylic or vinyl resins, elastic plastic products of the latter of which have been used quite extensively in the manufacture of so-called "Vinylite" elastic glass suspenders, elastic glass belts, and the like which present smooth glossy surfaces, and in which the buckles while formed of like resins, which when subjected to a different degree of polymerization are of relatively rigid construction.

The present invention therefore comprises a snap fastener construction in which one or both of the strips having the complementary snap fastener on them may be made of elastic plastic material, one being provided with open or closed apertures forming sockets, and the other having formed integral therewith or secured thereto suitable studs having a head of slightly greater cross sectional area than that of the socket or entrance to the socket in the cooperating socket member.

Another object of the invention is to provide a stud having a shank which is longitudinally grooved or corrugated and which will more effectively be engaged by the contracting wall of the socket after the head of the stud has been inserted through it.

Preferred embodiments of the invention are illustrated in the accompanying drawing, in which, Fig. 1 is a plan view of complementary snap fasteners in unassembled position comprising tapes having secured to the edges thereof strips of elastic plastic material provided respectively with studs and complementary apertures forming sockets to receive the heads of the studs;

Fig. 2 is a detail vertical sectional view on line 2—2 Fig. 1, of one form of stud assembly, the studs being shown in elevation;

Fig. 3 is a detail vertical transverse sectional view of the assembled construction, on an enlarged scale, illustrated in Figs. 1 and 2, the stud being shown in elevation;

Fig. 4 is a detail vertical sectional view, on an enlarged scale, of a modified form of an elastic plastic strip section having the base of the stud embedded therein and showing the stud in elevation;

Fig. 5 is a detail sectional view on an enlarged scale of a modified form of construction in which solid studs are formed integral with the strip of elastic plastic material;

Fig. 6 is a similar detail sectional view of an elastic plastic strip having integral studs extending therefrom, the studs being hollow;

Fig. 7 is an enlarged detail sectional view showing the base of a stud cohesively secured to the strip of plastic material;

Fig. 8 is a similar enlarged sectional view showing a stud of plastic material stitched to a suitable base, the shank of the stud being provided with grooves adapted more effectively to be engaged by the contracted wall of the elastic plastic material of the complementary member;

Fig. 9 is a horizontal sectional view on line 9—9 Fig. 8;

Fig. 10 is an enlarged detail sectional view of a section of portions of complementary strips of elastic plastic material, one of which is provided with a closed socket to receive the head of the stud, the base of which is embedded in the complementary strip of elastic plastic material; and, Fig. 11 is a view of a modified construction of the character illustrated in Fig. 3, in which the tape overlies the elastic plastic strip and is secured to it by lines of longitudinal stitching, thus concealing the head of the stud, the stud being shown as embedded in the complementary elastic plastic strip.

The invention comprises broadly a snap fastener comprising a member preferably in the form of a strip of elastic plastic material having an aperture or suitably spaced apertures therein adapted to permit the enlarged heads of suitable studs to be inserted therethrough and which when so inserted will be releasably held in place by the contraction of the wall of the aperture or apertures, together with a complementary member having secured to it a stud or preferably a plurality of studs spaced similarly to the sockets in the other member, so that the heads of the stud or studs may be inserted into the proper socket of such member.

The term "socket" is used herein as embracing any opening or hollow that forms a holder for something whether the opening extends partly or wholly through the member of the snap fastener.

The term "stud" as used herein broadly comprises a shank having a suitable base and a head adapted to be inserted in the socket of the companion snap fastener member, whether the stud is formed integral with or separate from the base to which it is secured.

The stud may be of any suitable material preferably, but not necessarily, of greater stiffness than that of the elastic plastic member or members to enable it more readily to be inserted into or through the socket in the complementary elastic plastic snap fastener member.

The elastic plastic material desirably is of such character that it can be secured to a tape or other base of suitable material by stitching either by thread, staples, or in any other suitable manner.

In the construction shown in Fig. 1 a strip 1 of elastic plastic material is superimposed upon a tape 2 of suitable material with one edge 3 of the elastic plastic strip substantially coincident with a corresponding edge of the tape and is fixedly secured thereto by lines of stitching 4 and 5 extending longitudinally of and adjacent to the edge of the strip. Desirably the strip is provided with grooves 6 and 7 as illustrated in Fig. 3 to form guides for the lines of stitching.

Suitable studs, which, as illustrated in Figs. 1 and 3, are independently made, are located at suitably spaced intervals with the bases 8 of said studs interposed and held between the elastic plastic stirp 1 and the tape 2, with the shanks 9 of the studs extending through suitable apertures in the elastic plastic composition. The studs are provided with heads 10 of slightly larger cross sectional area than that of the sockets in the complementary snap fastener member.

In assembling this snap fastener member the heads of the studs are first inserted through the apertures in the elastic plastic strip 1 and the strip stitched to the tape in the manner aforesaid, thereby clamping the bases of the studs firmly between the elastic plastic strip and the underlying tape.

A complementary snap fastener member comprises a strip 11 of elastic plastic material having apertures 12 therein or therethrough at suitable spaced intervals corresponding to the spacings of the studs aforesaid, the elastic plastic strip desirably but not necessarily being of the same material as that of the elastic plastic strip in which the studs are secured.

As illustrated in Fig. 1 the elastic plastic strip overlies a suitable tape 13 and projects well beyond the edge 14 thereof and is secured to said tape by a line of stitching 15 preferably located in a guiding groove 16 extending parallel to and adjacent to the edge of the elastic plastic strip, as shown in Fig. 3.

As heretofore stated the studs may be made independently of the elastic plastic strip and may be of any suitable material, such as metal, glass, or plastic material, of greater stiffness than the elastic plastic material of the strips 10 and 11. The studs when thus made independently may be secured to the elastic plastic strip in any suitable manner or to a suitable tape or body.

As illustrated in Fig. 4 the flat base 17 of a stud or suitably spaced studs 18 is embedded in the strip 1 of elastic plastic material, the shank of the stud extending through the upper surface thereof a suitable distance and provided with a head 19 of the character described.

In the construction illustrated in Fig. 5 similar studs 20 are formed integrally with the strip 1 of elastic plastic material and spaced at suitable intervals corresponding to the spacing of the sockets in the complementary elastic plastic snap fastener member.

Snap fastener strips having studs of this character may be conveniently moulded and if desirable the studs may be tempered to greater stiffness to the body of the strip.

A modified construction is shown in Fig. 6 in which the studs 21 are formed integrally with the elastic plastic strips but are provided with hollow centers which may be formed in any suitable manner during the molding process, as for example by providing for the cavity of the stud or by forcing the elastic plastic material into the core by a central jet of controlled air under pressure. The stud may, if desired, be provided with a core of metal or other rigid material.

A modified embodiment of the invention is illustrated in Fig. 7 in which the base 22 of the stud 23 is adhesively secured to the elastic plastic strip 1 by suitable adhesive 24 or if the stud is formed of elastic plastic material it may be cohesively secured to the strip by a suitable solvent.

Obviously a stud or studs may be secured directly to the tape or suitable body by stitching or stapling or if the body is of wood or other hard material, such as furniture, the stud may be secured to it by suitable brads, nails, or adhesive.

A desirable form of stud is illustrated in Figs. 8 and 9 which comprises a base 25 secured in any suitable manner to a body 26, the shank 27 of the stud being provided with a series of grooves or corrugations 28 extending from the base 25 of the stud to the enlarged head 29 thereof adapted more effectively to be gripped by the contracting wall of the aperture of the socket in the complementary elastic plastic strip 11.

A further modified form of the invention is illustrated in Fig. 10 in which a strip of elastic plastic material 1 is provided with suitable studs 30 having reversely tapered heads 31 adapted to be seated in a complementary closed recess 32 in the elastic plastic strip 11, the lower portion of the wall of the socket desirably being provided with a tapering bevel 33 to facilitate introduction of the stud into the socket.

A modified manner of assembling the tape upon the elastic plastic strip of material having the sockets therein is illustrated in Fig. 11 in which the tape 13 overlies the sockets in the elastic plastic strip 11 with its edge coincident with one edge of the strip, the tape being secured to the strip by lines of stitching 34 and 35 extending longitudinally of the strip adjacent to the edges thereof. In this construction therefore the tape overlies and conceals the head 36 of the stud 37, the base 38 of which may be embedded in the elastic plastic strip 1 or may be secured thereto or to a suitable base in any of the ways above described.

By reason of the present invention snap fasteners are provided which may be made of non-metallic materials which are more available than metal required in usual snap fastener constructions and in which the parts can be produced by moulding, extrusion, or otherwise, without the employment of intricate machinery and the necessary supervision to maintain the machinery in operative condition. The materials employed are waterproof, rustproof, and otherwise non-corrodible, present smooth glossy surfaces and do not require protective coating as do the complementary members of metallic fasteners and thereby further reduce the cost of manufacture.

Snap fastener strips made in accordance with the present invention, when sewed upon garments, present smooth surfaces which will not tear or abrade materials with which they may come in contact. They need not be removed when the garment is to be laundered as their flexibility will permit necessary manipulation of the garment and the resistance to rust or to corrosion by alkalis or other ingredients of the solution used in washing will avoid injury not only to the fastening members but to the solution and to other garments with which they may be thrown in contact.

It will be understood that various types of plastic or thermoplastic materials having suitable elasticity and flexibility may be employed for the socket member or members of the snap fastener herein described as certain materials of this sort are now available and that the studs may be formed of any suitable material, but preferably of a polymerized plastic or thermoplastic material integral with the strip and polymerized or otherwise tempered to greater stiffness than that of the elastic plastic strip containing the socket, and that various changes in form of the elements of the snap fastener may be made, the particular constructions herein described being illustrative of but not restrictive of the invention as defined in the following claims.

Having thus described the invention, what is claimed as new, and desired to be secured by Letters Patent, is:

1. A snap fastener assembly comprising complementary strips of elastic polymerized vinyl plastic material capable of being stitched to a suitable base, one of which strips is provided at suitable intervals with stud-receiving sockets, and the other of which is provided at like intervals with integral studs of relatively hard temper having heads of slightly greater cross sectional area than that of said sockets.

2. A snap fastener comprising a pair of complementary narrow strips each of elastic synthetic waterproof non-corrodible plastic material capable of being readily stitched to members of the article to be fastened, one of said strips having suitably spaced sockets along its length each adapted to be resiliently enlarged by expansive pressure exerted upon the wall thereof and the other strip provided at similarly spaced intervals with relatively rigid studs having shanks anchored to said strip by the elastic material of the strip and having heads of slightly greater cross sectional area than that of the sockets.

3. A snap fastener comprising a pair of complementary narrow strips each of elastic synthetic waterproof non-corrodible plastic material capable of being readily stitched to members of the article to be fastened, one of said strips having suitably spaced sockets along its length each adapted to be resiliently enlarged by expansive pressure exerted upon the wall thereof and the other strip provided at similarly spaced intervals with relatively rigid studs having shanks embedded and anchored in the elastic material of said strip and integral heads of slightly greater cross sectional area than the sockets.

4. A snap fastener comprising a pair of complementary narrow strips each of elastic synthetic waterproof non-corrodible plastic material capable of being readily stitched to members of the article to be fastened, one of said strips having suitably spaced sockets along its length each adapted to be resiliently enlarged by expansive pressure exerted upon the wall thereof and the other strip provided at similarly spaced intervals with relatively rigid studs each having a base and a portion of the shank thereof embedded in and anchored to said strip by the elastic material thereof and a head of slightly greater cross sectional area than that of the socket engaged by it.

5. A snap fastener comprising a pair of complementary narrow strips each of elastic synthetic water-proof non-corrodible plastic material capable of being readily stitched to members of the article to be fastened, one of said strips having suitably spaced sockets along its length each adapted to be resiliently enlarged by expansive pressure exerted upon the wall thereof and the other strip provided at similarly spaced intervals with relatively rigid studs integral with and projecting from said strip and provided with heads of slightly greater cross sectional area than the sockets.

6. A snap fastener comprising a pair of complementary narrow strips each of elastic synthetic waterproof non-corrodible plastic material having a glossy surface and capable of being readily stitched to members of the article to be fastened, one of said strips having suitably spaced sockets along its length adapted to be resiliently enlarged by expansive pressure exerted upon the wall thereof, and the other strip provided at similarly spaced intervals with relatively rigid studs of like plastic material having shanks embedded in the elastic material of said strip and integral heads of slightly greater cross sectional area than the sockets.

7. As an article of manufacture a snap fastener assembly adapted to be secured to members of the article to be fastened comprising a narrow strip of elastic synthetic waterproof non-corrodible plastic material stitched along one edge to a suitable flexible tape and extending over the edge thereof and provided with suitably spaced stud-receiving sockets and a complementary strip of like synthetic plastic material secured along both edges thereof to the edge portion of a flexible tape and provided with studs of relatively stiff plastic material embedded therein at similarly spaced intervals and having heads of slightly greater cross sectional area than that of said sockets adapted releasably to engage said sockets.

8. A snap fastener for securing together edge portions of colored textile materials comprising a pair of complementary strips each of elastic synthetic, normally transparent, waterproof non-corrodible plastic material capable of being readily stitched to a suitable base impregnated with a color adapted to harmonize with the color of the material to which it is applied, one of said strips having at suitably spaced intervals stud-receiving sockets along its length adapted to be enlarged by expansive pressure exerted upon the wall thereof, and the other strip provided with similarly spaced rigid studs of like material having shanks anchored to said strip by the elastic material of the strip and having heads of slightly greater cross sectional area than that of said sockets.

ALEXANDER R. MITCHELL.